United States Patent
Garneyer et al.

(10) Patent No.: US 8,860,428 B2
(45) Date of Patent: Oct. 14, 2014

(54) APPARATUS AND METHOD FOR RECOGNIZING AN ERROR IN A POWER BRIDGE CIRCUIT

(75) Inventors: Eckart Garneyer, Regensburg (DE); Christoph Haggenmiller, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 709 days.

(21) Appl. No.: 12/937,473

(22) PCT Filed: Apr. 3, 2009

(86) PCT No.: PCT/EP2009/054002
§ 371 (c)(1),
(2), (4) Date: Oct. 12, 2010

(87) PCT Pub. No.: WO2009/124884
PCT Pub. Date: Oct. 15, 2009

(65) Prior Publication Data
US 2011/0031978 A1    Feb. 10, 2011

(30) Foreign Application Priority Data

Apr. 10, 2008    (DE) .......................... 10 2008 018 244

(51) Int. Cl.
*G01R 31/02*    (2006.01)
*H02H 7/08*    (2006.01)
*H02H 3/04*    (2006.01)

(52) U.S. Cl.
CPC ............. *H02H 7/0838* (2013.01); *H02H 3/044* (2013.01)
USPC ........... 324/537; 324/415; 324/713; 323/315; 327/50; 327/67; 327/157; 327/403; 327/540; 361/93.1; 361/94; 361/98; 702/117

(58) Field of Classification Search
USPC ............. 324/537, 415, 713; 323/315; 327/50, 327/67, 157, 403, 540; 361/93.1, 94, 98; 702/117; 714/47
See application file for complete search history.

(56) References Cited

U.S. PATENT DOCUMENTS 4,727,309 A   *   2/1988   Vajdic et al. .................. 323/315
5,409,258 A       4/1995   Kawabata
(Continued)

FOREIGN PATENT DOCUMENTS

DE           4413194 A1    11/1994
DE    102006045308 A1    3/2008

*Primary Examiner* — Jermele M Hollington
*Assistant Examiner* — Giovanni Astacio-Oquendo
(74) *Attorney, Agent, or Firm* — Laurence A. Greenberg; Werner H. Stemer; Ralph E. Locher (57) ABSTRACT

An apparatus and a method for recognizing an error in a power bridge circuit containing a load, a high-side branch and a low-side branch. Accordingly, a first switched current source is connected to the load and to a diagnosis connection for a high-potential of a diagnosis voltage, a second switched current source is connected to the load and to a diagnosis connection for a low-potential of the diagnosis voltage, and a control device for controlling the first switched current source and the second switched current source. The control device switches on one of the switched current sources when the high-side power switch and the low-side power switch are open, while the other switched current source is switched off. A testing device tests a voltage at the load when one of the switched current sources is switched on and the other of the switched current sources is switched off.

20 Claims, 8 Drawing Sheets

(56) References Cited

U.S. PATENT DOCUMENTS

| | | | |
|---|---|---|---|
| 5,438,286 A * | 8/1995 | Pavlin et al. | 327/50 |
| 5,642,247 A | 6/1997 | Giordano | |
| 5,754,074 A * | 5/1998 | Kelly | 327/434 |
| 5,760,613 A * | 6/1998 | Pulvirenti et al. | 327/67 |
| 5,774,321 A * | 6/1998 | Kim et al. | 361/94 |
| 5,903,422 A * | 5/1999 | Hosokawa | 361/93.1 |
| 6,140,821 A * | 10/2000 | Fendt et al. | 324/502 |
| 6,147,550 A * | 11/2000 | Holloway | 327/544 |
| 6,294,947 B1 * | 9/2001 | Gabara | 327/403 |
| 6,445,244 B1 * | 9/2002 | Stratakos et al. | 327/540 |
| 7,049,832 B2 * | 5/2006 | Novak et al. | 324/713 |
| 7,280,333 B2 * | 10/2007 | Horsky et al. | 361/93.1 |
| 7,433,793 B2 * | 10/2008 | Mori | 702/117 |
| 7,808,757 B2 * | 10/2010 | Guillott et al. | 361/93.1 |
| 2005/0195003 A1 * | 9/2005 | Soe | 327/157 |
| 2006/0082376 A1 * | 4/2006 | Allen et al. | 324/522 |
| 2006/0256492 A1 | 11/2006 | Zhao et al. | |
| 2008/0084241 A1 | 4/2008 | Yamamoto et al. | |
| 2008/0150539 A1 * | 6/2008 | Arndt et al. | 324/415 |
| 2008/0259515 A1 * | 10/2008 | Turpin et al. | 361/98 |
| 2009/0309607 A1 | 12/2009 | Arndt et al. | |
| 2010/0050024 A1 * | 2/2010 | Covalenco et al. | 714/47 |
| 2011/0279183 A1 * | 11/2011 | Froidevaux et al. | 330/291 |

* cited by examiner

APPARATUS AND METHOD FOR RECOGNIZING AN ERROR IN A POWER BRIDGE CIRCUIT

BACKGROUND OF THE INVENTION

Field of the Invention

The present invention relates to an apparatus for recognizing an error in a power bridge circuit having a load, a high-side branch, in which a high-side power switch is disposed between a high-side connection of the load and a supply connection for a high potential of a supply voltage, and a low-side branch, in which a low-side power switch is disposed between a low-side connection of the load and a supply connection for a low potential of the supply voltage. The present invention further relates to a corresponding method for recognizing an error in a power bridge circuit.

Such an apparatus and such a method are known. In automotive engineering in particular the recognition and differentiation of different errors, such as short circuits across individual elements, and protection against destructive overload are of particular importance. The diagnosis must be achieved with the lowest possible outlay here for cost reasons specifically.

With such a power bridge circuit short circuits can take place across the high-side power switch (error SCB1), across the series circuit comprising the high-side power switch and load (error SCB2), across the low-side power switch (error SCG1) and across the series circuit comprising the low-side power switch and load (error SCG2). Excessively high currents can result from such a short circuit. An open load can also result, the connection to the load then being broken (error OL). The errors can in principle occur before the load is switched on but also during operation of the load.

Figure 1:
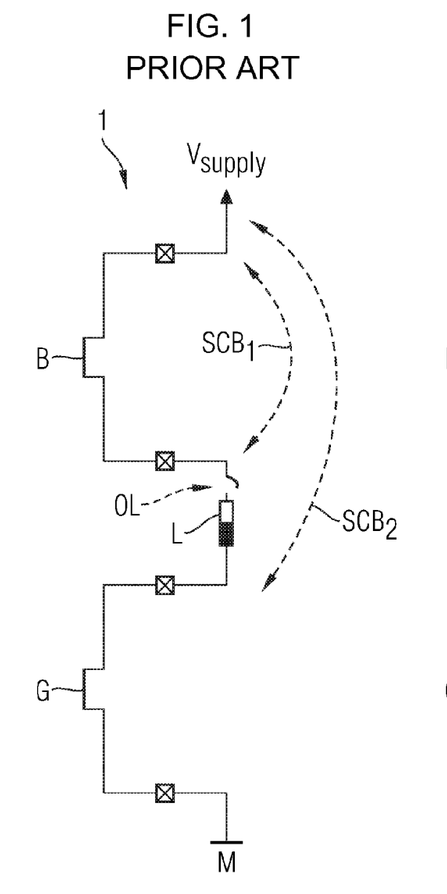
FIG. 1 shows an example of a known, basic structure of a power bridge circuit, illustrating errors that may occur at a high-side power switch.

FIG. 1 shows a basic structure of a power bridge circuit 1 having a high-side branch and a low-side branch. The power bridge circuit 1 contains a load L, which is in contact on its high side by way of a high-side power switch B with a supply voltage $V_{supply}$. On its low side the load L is connected to ground M by way of a low-side power switch G. The two power switches B and G are shown in their closed states here.

Possible errors here are a short circuit across the high-side power switch B alone, corresponding to the error SCB1, and a short circuit across the series circuit comprising the high-side power switch B and load L, corresponding to the error SCB2, and a break in the connection to the load, corresponding to the error OL.

Figure 2:
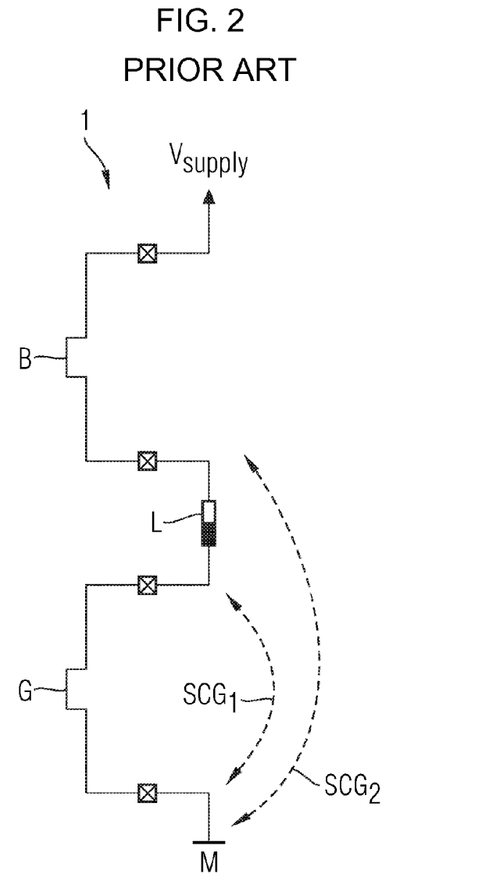
FIG. 2 shows the known power bridge circuit according to FIG. 1, illustrating errors that may occur at a low-side power switch.

FIG. 2 shows the power bridge circuit 1 with corresponding possible errors across the low-side power switch G. These errors are short circuits across the low-side power switch G alone, corresponding to the error SCG1, and across the series circuit comprising the low-side power switch G and load L, corresponding to the error SCG2.

Monitoring apparatuses are already known, which are able to differentiate between the different errors. However a considerable circuit outlay results with these in particular on the high side of the power bridge circuit, as all the circuit parts have to be designed for high voltages.

Errors SCB1 and SCB2 can be diagnosed with the load switched off, by injecting a voltage to the high-side output or the low-side output of the power bridge circuit and then checking the current, or vice versa. Alternatively the low-side power switch can be switched on separately and the current can be determined in diagnosis mode.

Errors SCG1 and SCG2 are determined by injecting a voltage in the switched off state to the high-side output or low-side output and checking the current, or vice versa. Alternatively the high-side power switch can be switched on individually and the current measurement can be carried out in diagnosis mode.

Error OL can be determined by injecting a voltage in the switched off state to the high-side output and checking the voltage at the low-side output, or vice versa. Alternatively error OL can be determined by injecting a current in the switched off state of the load to the high-side output and checking the current at the low-side output, or vice versa.

One significant disadvantage of the prior art is that complicated monitoring circuits with a plurality of components for injecting currents and voltages and for measuring currents and voltages are required to determine the different errors.

BRIEF SUMMARY OF THE INVENTION

The object of the present invention is therefore to overcome this disadvantage and allow recognition of different errors in a power bridge circuit in a technically simple manner with little, in particular circuit-related, outlay.

The inventive apparatus for recognizing an error in a power bridge circuit contains a first switched current source, which is connected to the load and a diagnosis connection for a high potential of a diagnosis voltage, and a second switched current source, which is connected to the load and a diagnosis connection for a low potential of the diagnosis voltage. A control device is also present to control the first switched current source and the second switched current source, the control device being embodied in such a manner that when the high-side power switch is open and the low-side power switch is open it switches on one of the switched current sources, while the other of the switched current sources is switched off, and then switches off one of the switched current sources and switches on the other of the switched current sources. A testing device serves to test a voltage at the load when one of the switched current sources is switched on and the other of the switched current sources is switched off, and when one of the switched current sources is switched off and the other of the switched current sources is switched on. The function of such a current source can also be realized by a voltage source with a resistor disposed in series therewith.

In the inventive method for recognizing an error in a power bridge circuit, with a first switched current source connected to the load and a diagnosis connection for a high potential of a diagnosis voltage and a second switched current source connected to the load and a diagnosis connection for a low potential of the diagnosis voltage, the first switched current source and the second switched current source are controlled by means of a control device. This is done in such a manner that when the high-side power switch is open and the low-side power switch is open one of the switched current sources is switched on while the other of the switched current sources is switched off. One of the switched current sources is then switched off and the other of the switched current sources is switched on. A voltage at the load is tested by means of a testing device, when one of the switched current sources is switched on and the other of the switched current sources is switched off and when one of the switched current sources is switched off and the other of the switched current sources is switched on.

Based on the present invention at least two switched current sources, i.e. the first and second switched current sources, to the high and low potential of the diagnosis voltage are used. This use takes place in conjunction with a sequential sequence of current application and testing phases, with the voltage at the load being tested by means of the testing device in the testing phases. The current application and testing phases can also take place simultaneously instead of sequentially. In any case at least two current application phases are used, in which testing can also take place. By turning the at least two switched current sources on and off it is possible to draw the switched off load to both the low and high potential of the diagnosis voltage. This is advantageously done consecutively, with the voltage at the load being tested in each of these consecutively assumed voltage states of the load by means of the testing device. Turning on the first and/or second switched current source advantageously stabilizes the potentials at the load, since in the switched off state, i.e. with the high-side and low-side power switches open, this floats. The potentials at the load are then undetermined. Output signals of the testing device here serve as the error recognition result for the sake of simplicity. Based on the present invention particularly fast testing of the power bridge circuit and diagnosis of errors can take place as relatively large currents can be used to recognize an error. This is particularly possible because the two current sources only have to be switched on for a short time for diagnosis purposes, so that any power loss occurring remains very small. The strength of the individual current sources here can advantageously be tailored to specific requirements. It is also possible to increase the strength of the current sources—for example after turning on—and reduce it after a predetermined period, to limit the power loss in the current source in the event of a short circuit. Inventive error recognition can also advantageously be implemented with an extremely small circuit outlay. It is also advantageous that there is no no-load current flowing apart from in the testing phase for recognizing errors. It is in particular possible to recognize a short circuit as an error by means of the present invention. In particular short circuits across the high-side power switch (error SCB1), across the series circuit comprising the high-side power switch and load (error SCB2), across the low-side power switch (error SCG1) and across the series circuit comprising the low-side power switch and load (error SCG2) can be recognized as errors. It is however also possible to recognize a break in the electrical connection to the load (error OL), i.e. an open load. The open load can occur due to a break in the connection to the load in the high-side branch and/or in the low-side branch of the power bridge circuit. In principle the load can in particular be an ohmic, ohmic-inductive, inductive or capacitive load.

In one advantageous embodiment of the invention the testing device features a comparison device for comparing the voltage at the load with a predetermined comparison voltage. Such a comparison device allows the voltage at the load to be checked in a particularly simple and economical manner. A comparator in particular can serve as the comparison device here. Based on the present invention it is possible for the sake of simplicity to deploy a comparator on just one of the two sides, i.e. the high or low side, of the load to recognize errors.

In a further, particularly advantageous embodiment the testing device is connected to the low-side connection of the load and the voltage at the load to be tested by the testing device is a low-side voltage occurring at the low-side connection of the load. With this embodiment of the invention the circuit outlay for recognizing the different errors is particularly small.

A further testing device for testing a further voltage at the load is preferably present. It is then possible to recognize and determine errors even more quickly, since in particular the error OL of the open load can be recognized automatically by the further testing device. Therefore a smaller number of consecutive diagnosis steps have to be carried out.

The further testing device particularly preferably features a comparison device for comparing the further voltage with a predetermined further comparison voltage. The further voltage at the load can be tested particularly simply and economically with the comparison device. A comparator in particular can serve as a comparison device here.

The further testing device is also preferably connected to the high-side connection of the load and the further voltage at the load to be tested by the testing device is a high-side voltage occurring at the high-side connection of the load. With this embodiment it is possible to recognize the different errors, in particular open load error OL, particularly efficiently with limited circuit outlay.

The first switched current source is particularly preferably connected to the low-side connection of the load. This advantageously allows the different errors, in particular errors SCG1, SCG2 and OL, to be recognized with particularly little circuit outlay.

In one advantageous embodiment of the invention the first switched current source is connected to the high-side connection of the load. This also ensures a particularly small circuit outlay for recognizing errors. Also a high level of flexibility is achieved when recognizing errors. This is particularly so when a number of loads are present in the power bridge circuit, using a common high-side power switch.

In a further, particularly advantageous embodiment a third switched current source is present, being connected to the low-side connection of the load and the diagnosis connection for the high-potential of the diagnosis voltage. The control device is also connected to the third switched current source to control it. This third current source can be employed particularly effectively for reliable recognition of the open load error.

The control device is preferably embodied in such a manner that it switches on the third switched current source when the first switched current source is switched on and the low-side voltage is lower than the predetermined comparison voltage when the first current source is switched on. This advantageously ensures particularly reliable recognition of the open load error.

The second switched current source is particularly preferably connected to the high-side connection of the load. This embodiment allows errors SCB1 and SCB2 to be recognized or excluded particularly reliably.

The low-side connection of the load is also preferably connected to a connected relief branch for the discharge of leakage currents. This contributes to even more reliable error recognition. Such leakage currents can in particular occur across the high-side power switch. Alternatively the high-side connection can also be connected to a connected relief branch. It would also be possible as an option to displace further current sources appropriately to achieve this effect.

The relief branch particularly preferably features a fourth switched current source, which is connected to the low-side connection of the load and the diagnosis connection for the low potential of the diagnosis voltage. This allows leakage currents to be dealt with particularly effectively and reliably. It is also possible here to realize the fourth switched current source by means of a resistor, to which a switch is connected in series. The leakage currents can be discharged by way of this resistor with the switch closed.

In one advantageous embodiment of the invention the high-side connection and the low-side connection of the load are connected by way of capacitors to the supply connection for the low potential of the supply voltage. The capacitances can be provided in a parasitic or intentional manner.

In a further, particularly advantageous embodiment the high side connection of the load is connected to the cathode of a first freewheeling diode, the supply connection for the low potential of the supply voltage is connected to the anode of the first freewheeling diode, the low-side connection of the load is connected to the anode of a second freewheeling diode and the supply connection for the high potential of the supply voltage is connected to the cathode of the second freewheeling diode. These freewheeling diodes are advantageous in particular in the case of an inductive or ohmic-inductive load, since when the load is switched off by opening high-side and low-side power switches, an equalizing current can flow across the freewheeling diodes.

The power bridge circuit preferably features at least one further load, the high-side connection of which is connected to the high-side power switch and the low-side connection of which is connected by way of a further low-side power switch to the supply connection for the low potential of the supply voltage. An additional testing device for testing a low-side voltage of the at least one further load is also present, the additional testing device being connected to the low-side connection of the at least one further load. This advantageously allows errors of the several loads present in the power bridge circuit to be recognized reliably and in a technically simple manner. The circuit outlay here is very small, as the first and second current sources can be employed for error recognition with the several loads. The loads are also connected by way of a common high-side power switch to the high potential of the supply voltage. The strengths of the current sources are preferably selected in an appropriate manner here.

The power bridge circuit particularly preferably features at least one further load, the low-side connection of which is connected to the low-side power switch and the high-side connection of which is connected by way of a further high-side power switch to the supply connection for the high potential of the supply voltage. A further switched current source is also present, being connected to the at least one further load and the diagnosis connection for the low potential of the diagnosis voltage. This also advantageously allows errors of the several loads present in the power bridge circuit to be recognized in a reliable and technically simple manner. The circuit outlay is very small here, in particular as a single testing device can be employed for error recognition in the several loads. The loads are also connected by way of a common low-side power switch to the high potential of the supply voltage.

The control device is also preferably embodied in such a manner that when the high-side power switches are open and the low-side power switch is open, it switches on either the second switched current source or the further switched current source. Such turning on of the current sources takes place in particular consecutively, with the previously switched on current source first being switched off again when the next of the current sources is switched on. This allows one of the errors at the loads to be recognized particularly efficiently and simply without major outlay.

The load is particularly preferably a capacitive load. The first switched current source is also connected to the high-side connection of the load. A first additional switched current source is also present, being connected to the low-side connection of the capacitive load and the diagnosis connection for the high potential of the diagnosis voltage. A second additional switched current source is also present, being connected to the low-side connection of the capacitive load and the diagnosis connection for the low potential of the diagnosis voltage. The control device is also connected to the first and second additional switched current sources to control them and is embodied in such a manner that when the high-side power switch is open and the low-side power switch is open, it switches on the first switched current source and the first additional switched current source, while the second switched current source and the second additional switched current source are switched off, and switches on the second switched current source and the second additional switched current source, while the first switched current source and the first additional switched current source are switched off.

In one advantageous embodiment of the invention the high-side power switch and the low-side power switch can be controlled in such a manner and the control device for controlling the first switched current source, the second switched current source, the third switched current source and the additional switched current source is also embodied in such a manner that charging of the capacitive load takes place first, followed by discharging. A detection device is also present for detecting a charge and discharge time during the charging and discharging of the capacitive load. This advantageously allows the available capacitance of the capacitive load to be determined. This optionally allows a conclusion to be drawn about a specified state of the load, for example whether the load is operating correctly. This allows further errors at the load and in its operation to be recognized. In principle the time period for charging and discharging the capacitive load is proportional to its capacitance.

In a further, particularly advantageous embodiment the control device is embodied in such a manner that when the high-side power switch is open and the low-side power switch is closed, to charge the capacitive load, it first switches on the first switched current source, while the second switched current source is switched off, and then, to discharge the capacitive load, it switches off the first switched current source and switches on the second switched current source. This allows in particular recognition of the error OL of the open load and estimation of the capacitance of the capacitive load in a simple and reliable manner. Additionally or alternatively it would also be possible to close the high-side power switch to carry out the charging and discharging of the capacitive load with the current sources on the lower supply voltage side (low side).

The invention and its advantages are described in more detail below based on examples and exemplary embodiments and the accompanying drawing, in which:

DESCRIPTION OF THE INVENTION

Identical elements or elements of identical function are shown with the same reference characters in the figures below, unless otherwise stated.

Figure 3:
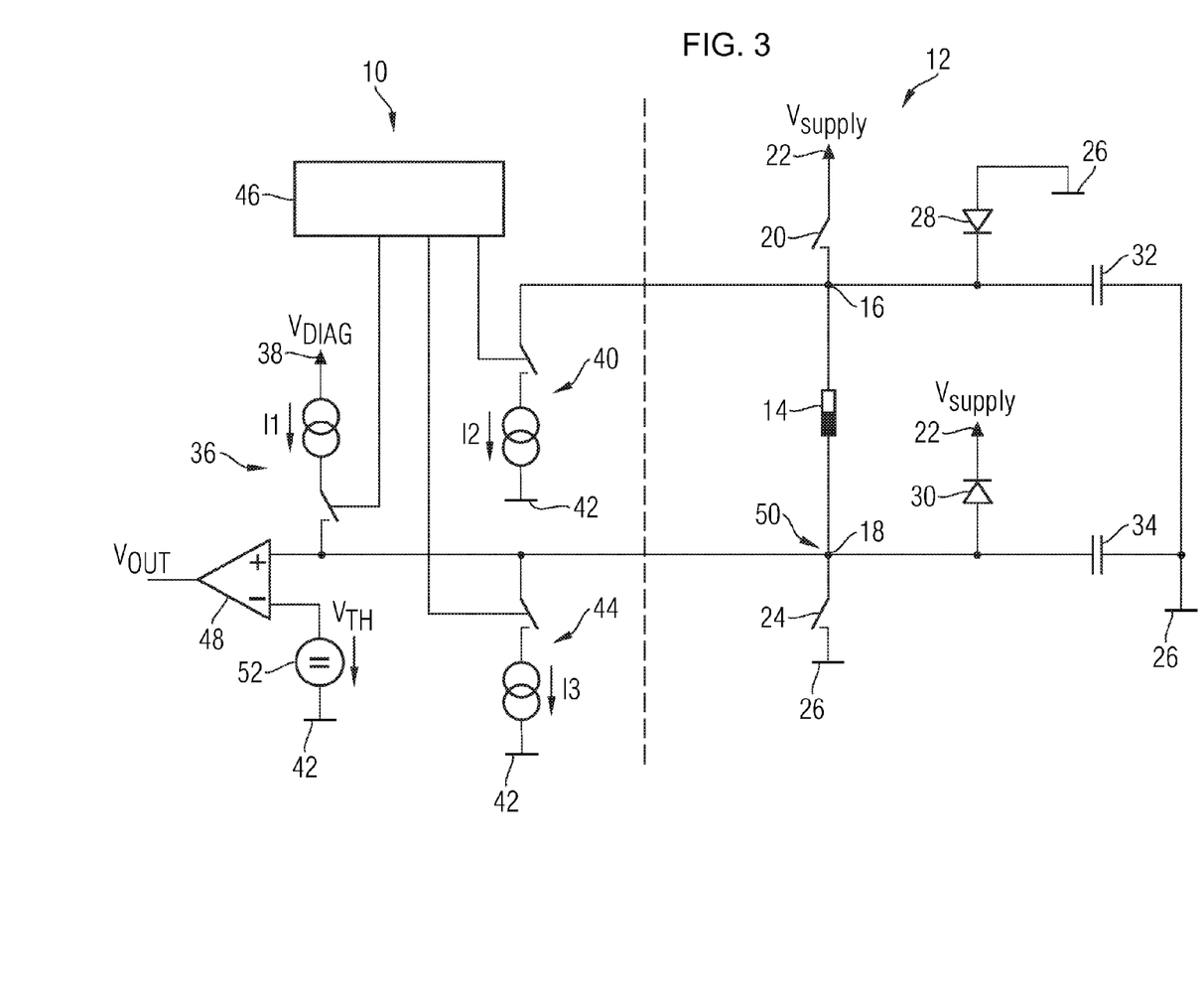
FIG. 3 shows a first exemplary embodiment of the inventive apparatus having a switched current source connected to the low-side connection of the load, which is connected to a high potential of a diagnosis voltage.

FIG. 3 shows a first exemplary embodiment of an inventive apparatus 10 for recognizing an error in a power bridge circuit 12. The power bridge circuit 12 features a load 14, which has a high-side connection 16 and a low-side connection 18. In the present exemplary embodiment the load 14 is an ohmic-inductive load. However it is in principle also possible for the load 14 to be a purely ohmic or purely inductive load or a capacitive load. The high-side connection 16 of the load 14 is connected by way of a high-side power switch 20 to a high potential 22 of a supply voltage $V_{supply}$. The low-side connection 18 of the load 14 is connected by way of a low-side power switch 24 to a low potential 26 of the supply voltage $V_{supply}$. The low potential 26 of the supply voltage $V_{supply}$ is ground in the exemplary embodiments described here. The high-side connection 16 is connected by way of a freewheeling diode 28 to the low potential 26, the anode of the freewheeling diode 28 being connected to the low potential 26 and the cathode of the freewheeling diode 28 being connected to the high-side connection 16. The low-side connection 18 of the load 14 is connected by way of a freewheeling diode 30 to the high potential 22, the cathode of the freewheeling diode 30 being connected to the high potential 22 and the anode of the freewheeling diode 30 being connected to the low-side connection 18. The high-side connection 16 is also connected by way of a capacitor 32 and the low-side connection 18 by way of a capacitor 34 to the low potential 26. The capacitors 32 and 34 can be integrated parasitically or intentionally.

The apparatus 10 features a switched current source 36 connected to the low-side connection 18 of the load 14. The switched current source 36 is also connected to a high potential 38 of a diagnosis voltage $V_{DIAG}$. The apparatus 10 also features a switched current source 40 connected to the high-side connection 16 of the load 14. The switched current source 40 is also connected to a low potential 42 of the diagnosis voltage $V_{DIAG}$. The low potential 42 of the diagnosis voltage $V_{DIAG}$ is ground in the exemplary embodiments described here. The apparatus 10 also features a further switched current source 44 connected to the low-side connection 18 of the load 14. The switched current source 44 is connected to a low potential 42 of the diagnosis voltage $V_{DIAG}$. The switched current sources 36, 40 and 44 used in this exemplary embodiment and the switched current sources deployed in the other exemplary embodiments each supply a current of constant current strength, which can be injected by way of a switch into a closed current circuit. Such a switched current source can be realized for example by means of a transistor. It is also possible to realize the switched current sources by means of connected resistors. The switched current source 36 here supplies a current I1, the switched current source 40 a current I2 and the switched current source 44 a current I3. The switched current sources are connected to a control device 46, which controls the switched current sources to switch them on and off. The control device 46 is shown by way of example in FIG. 3 and is omitted from the further exemplary embodiments described with reference to FIGS. 4-9 for reasons of clarity. The switched current sources deployed in these further exemplary embodiments are also controlled to be switched on and off by way of the control device 46.

The apparatus 10 also features a testing device 48 connected to the low-side connection 18 of the load 14 for testing a low-side voltage 50 occurring at the low-side connection 18. The testing device 48 here features a comparison device in the shape of a comparator. The comparator compares two voltages present at its inputs and outputs a corresponding output signal $V_{out}$ depending on which of the two voltages is greater. The comparator of the testing device 48 here compares the low-side voltage 50 with a comparison voltage $V_{TH}$, which is supplied by a voltage source 52 present at the comparator.

An error diagnosis sequence for recognizing or excluding errors in the power bridge circuit 12 by means of the apparatus 10 according to the first exemplary embodiment is described by way of example below. First all the switched current sources 36, 40, 44 of the apparatus 10 are switched off. After the load 14 has been switched off, in other words after the high-side power switch 20 and the low-side power switch 24 have been opened, a current continues to flow in the load 14 by way of the freewheeling diodes 28, 30, as the ohmic-inductive load 14 does not permit spontaneous current change. However this current decreases continuously until it is finally zero. The capacitor 34 is then charged to approximately the supply voltage $V_{supply}$. A current then flows through the load 14 again, so that the voltages present at the capacitors 32 and 34 approximate to one another. The interaction between the ohmic-inductive load 14 and the capacitors 32, 34 may in some instances produce an attenuated oscillation for a time. In the case of a purely ohmic load 14 the capacitor 32 would instead be charged to the supply voltage $V_{supply}$ after the load 14 has been switched off.

In a next step the switched current sources 40 and 44 are switched on by the control device 46. The switched current source 44 is deployed to discharge leakage currents, which can occur in particular at the freewheeling diode 30 and the high-side power switch 20. Switching on the switched current source 40 causes the current I2 to be injected at the high-side connection 16. In those instances where there are no short circuits across the high-side power switch 20 or the series circuit comprising the high-side power switch 20 and load 14, the two capacitors 32, 34 and the ohmic-inductive load 14 would have to be discharged. The low-side voltage 50 would then have to decrease and ultimately drop to below the predetermined comparison voltage $V_{TH}$. This would be detected by the testing device 48, as the output signal $V_{OUT}$ of the comparator changes. Therefore if the testing device 48 detects a drop in the low-side voltage 50 to below the comparison voltage $V_{TH}$, errors SCB1 and SCB2 can be excluded. If the testing device 48 does not detect such a drop in the low-side voltage 50 to below the comparison voltage $V_{TH}$, one of the errors SCB1 and SCB2, and therefore a short circuit, is present.

In the next step the switched current source 40 is switched off by means of the control device 46 and the switched current source 36 is switched on. Switching on the switched current source 36 causes the current I1 to be injected at the low-side connection 18. In those instances where there are no short circuits across the low-side power switch 24 or the series circuit comprising the low-side power switch 24 and load 14, the low-side voltage 50 would have to rise and ultimately reach the level of the predetermined comparison voltage $V_{TH}$. This would be detected by the testing device 48, as the output signal $V_{OUT}$ of the comparator changes. Therefore if the testing device 48 detects a rise in the low-side voltage 50 to above the comparison voltage $V_{TH}$, errors SCG1 and SCG2 can be excluded. If the testing device 48 does not detect such a rise in the low-side voltage 50 to above the comparison voltage $V_{TH}$, one of the errors SCG1 and SCG2, and therefore a short circuit, is present.

To recognize an open load 14, in other words error OL, the switched current source 36 continues in the switched on state and the switched current source 40 is also switched on again. The two switched current sources 36 and 40 here are dimensioned so that the current I1 injected by the switched current source 36 is smaller than the current I2 injected by the switched current source 40. This means that when there is no open load 14 present, in other words no break in the connections of the load 14, the low-side voltage 50 would have to drop back to below the predetermined comparison voltage $V_{TH}$. Therefore if the testing device 48 detects such a drop in the low-side voltage 50, error OL can be excluded. On the other hand if the testing device 48 does not detect such a drop in the low-side voltage 50, error OL is present.

Figure 4:
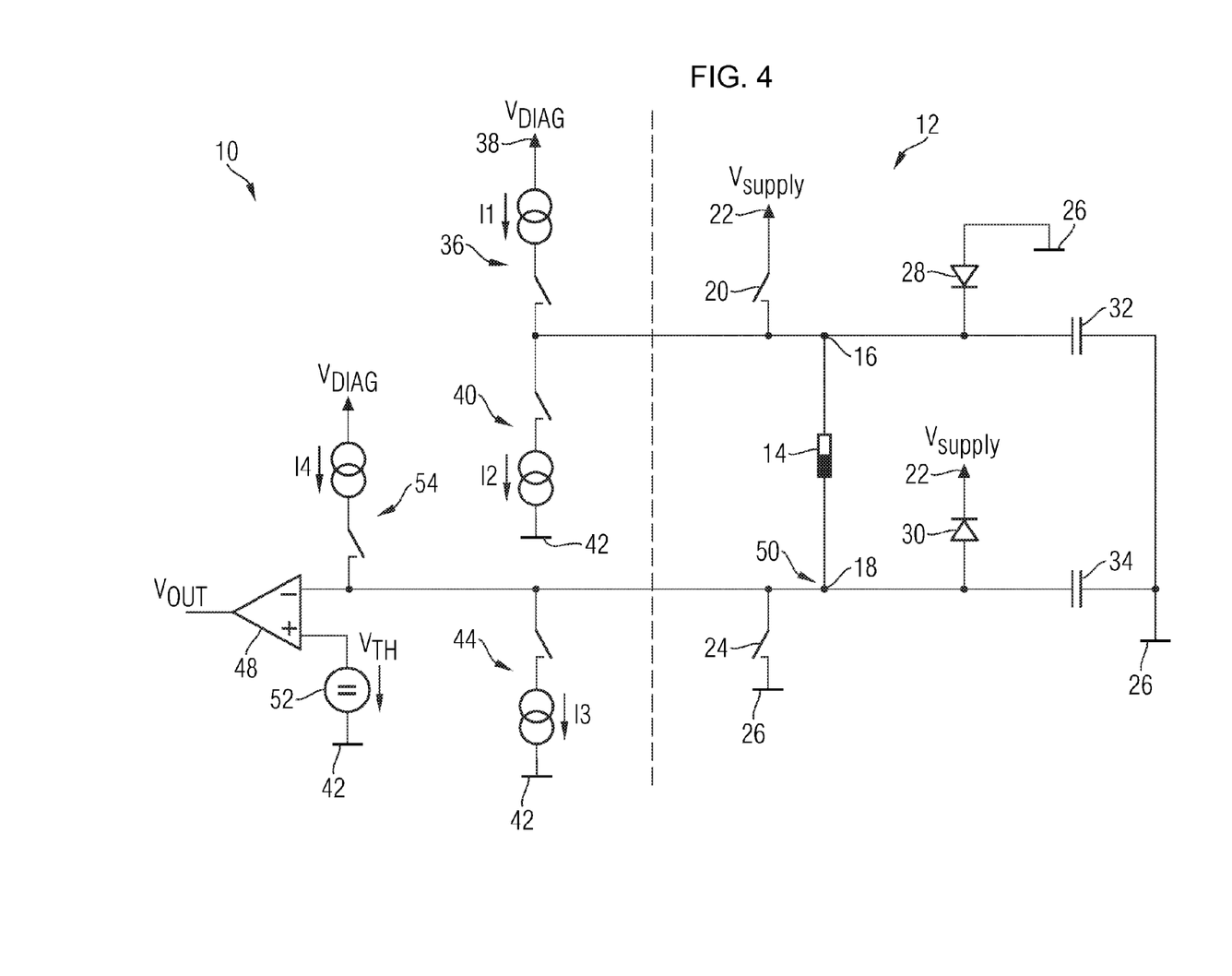
FIG. 4 shows a second exemplary embodiment of the inventive apparatus having a switched current source connected to the high-side connection of the load, which is connected to the high potential or the diagnosis voltage, and a further switched current source connected to the low-side connection of the load, which is also connected to the high potential of the diagnosis voltage.

FIG. 4 shows a second exemplary embodiment of the inventive apparatus 10. In this second exemplary embodiment the switched current source 36, which supplies the current I1, is connected to the high-side connection 16 of the load 14. The switched current source 36 is connected to the high potential 38 of the diagnosis voltage $V_{DIAG}$. The switched current sources 40 and 44 are connected as in the first exemplary embodiment according to FIG. 3. The apparatus 10 here features a further switched current source 54, which is connected on the one hand to the high potential 38 of the diagnosis voltage $V_{DIAG}$ and on the other hand to the low-side connection 18 of the load 14. The switched current source 54 supplies a current I4.

An error diagnosis sequence for recognizing or excluding errors in the power bridge circuit 12 by means of the apparatus 10 according to the second exemplary embodiment is described by way of example below. First all the switched current sources 36, 40, 44 and 54 of the apparatus 10 are switched off. After the load 14 has been switched off, a current continues to flow in the load 14 by way of the freewheeling diodes 28, 30. This current decreases continuously until it is finally zero. The capacitor 34 is then charged to approximately the supply voltage $V_{supply}$. A current then flows through the load 14 again, so that the voltages present at the capacitors 32 and 34 approximate to one another.

The switched current sources 40 and 44 are then switched on. The switched current source 44 again serves to discharge leakage voltages. Switching on the switched current source 40 causes the current I2 to be injected at the high-side connection 16. In those instances where there are no short circuits across the high-side power switch 20 or the series circuit comprising the high-side power switch 20 and load 14, the two capacitors 32, 34 and the ohmic-inductive load 14 would have to be discharged. The low-side voltage 50 would then have to decrease and ultimately drop to below the predetermined comparison voltage $V_{TH}$. This would be detected by the testing device 48, as the output signal $V_{OUT}$ of the comparator changes. Therefore if the testing device 48 detects a drop in the low-side voltage 50 to below the comparison voltage $V_{TH}$, errors SCB1 and SCB2 can be excluded. On the other hand, if the testing device 48 does not detect such a drop in the low-side voltage 50 to below the comparison voltage $V_{TH}$, one of the errors SCB1 and SCB2, and therefore a short circuit, is present. To this extent the procedure corresponds to the one in the first exemplary embodiment.

In the next step the switched current source 40 is switched off and the switched current source 36 is switched on. Switching on the switched current source 36 causes the current I1 to be injected at the high-side connection 16 and to be fed into the load side. In those instances where there are no short circuits across the low-side power switch 24 or the series circuit comprising the low-side power switch 24 and load 14, and no breaks in the connections to the load 14, in other words an open load 14, the low-side voltage 50 would have to rise and ultimately reach the level of the predetermined comparison voltage $V_{TH}$. This would be detected by the testing device 48, as the output signal $V_{OUT}$ of the comparator changes. Therefore if the testing device 48 detects a rise in the low-side voltage 50 to above the comparison voltage $V_{TH}$, errors SCG1, SCG2 and OL can be excluded. If the testing device 48 does not detect such a rise in the low-side voltage 50 to above the comparison voltage $V_{TH}$, one of the errors SCG1, SCG2 or OL is present.

If one of the errors SCG1, SCG2 or OL is recognized in the previous step, in a next step the further switched current source 54 is switched on by the control device 46. The switched current source 36 also remains switched on. If the low-side voltage 50 now rises and ultimately reaches the predetermined comparison voltage $V_{TH}$, this is detected by the testing device 48, as the output signal $V_{OUT}$ of the comparator changes. In the event of such a rise in the low-side voltage 50, there can be no short circuits present across the low-side power switch 24 and the series circuit comprising the low-side power switch 24 and load 14. Errors SCG1 and SCG2 can therefore be excluded. Instead error OL is recognized. If the low-side voltage 50 remains below the comparison voltage $V_{TH}$ after the switched current source 54 has been switched on, one of the errors SCG1 or SCG2 is present.

The procedure described above for recognizing whether one of the errors SCG1, SCG2 or error OL is present may be modified. This is described below in a third exemplary embodiment of the inventive apparatus 10 with reference to FIG. 5. There is no further switched current source 54 in the apparatus 10 according to the third exemplary embodiment. Instead a further testing device 56 is present for testing a further voltage at the load 14. This further testing device 56 is connected to the high-side connection 16 of the load 14, so that a high-side voltage 58 can be tested by means of the further testing device 56. The further testing device 56 here features a comparison device in the shape of a comparator, which compares voltages present at its inputs with one another and outputs a corresponding output signal $V_{out'}$. The comparator of the testing device 56 here compares the high-side voltage 58 with a further comparison voltage $V_{TH'}$, which is supplied by a further voltage source 60 present at the comparator.

Figure 5:
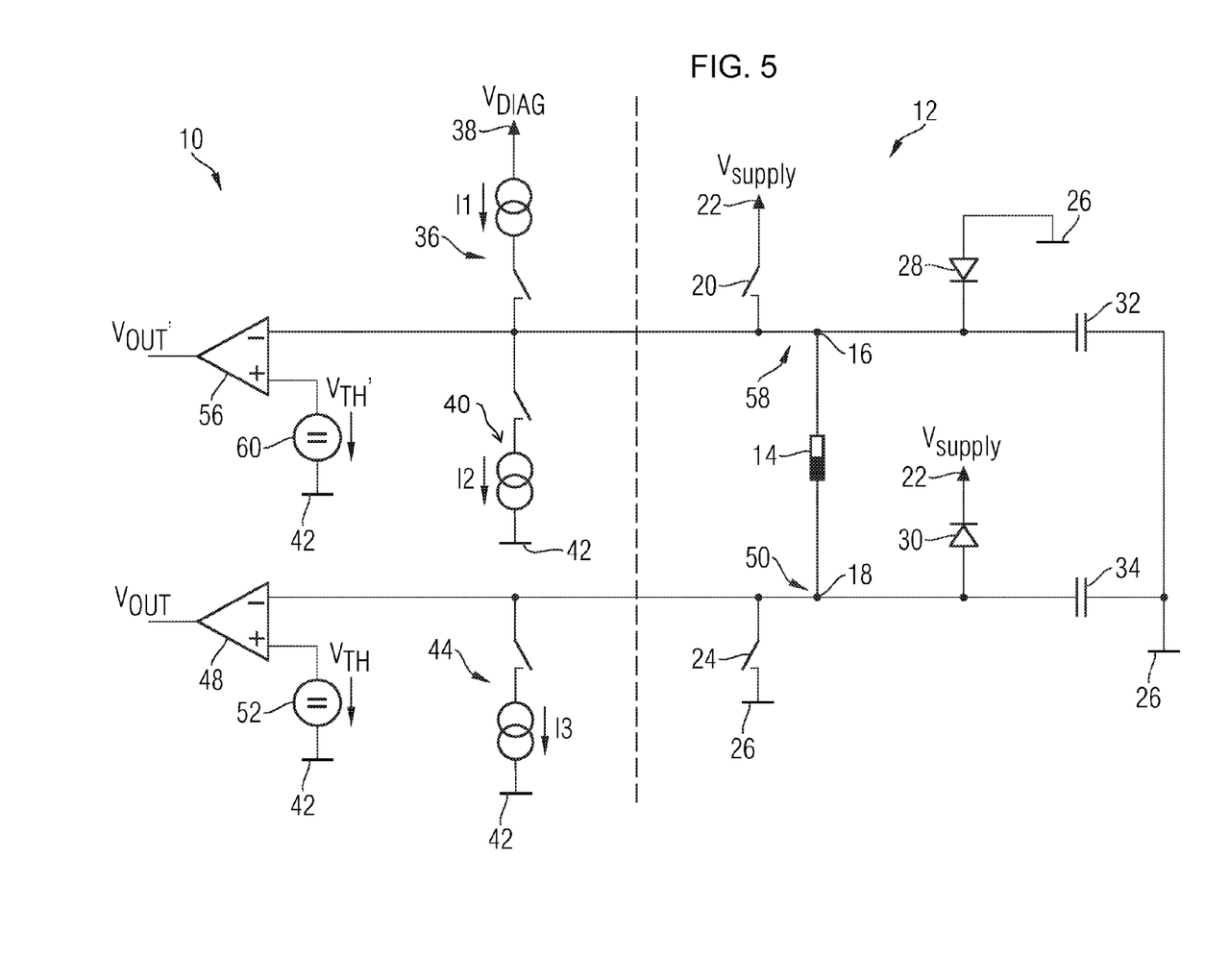
FIG. 5 shows a third exemplary embodiment of the inventive apparatus having a switched current source connected to the high-side connection of the load, which is connected to the high potential of the diagnosis voltage, and a testing device connected to the high-side connection of the load.

After the switched current source 40 has been switched off and the switched current source 36 has been switched on it is then possible not only for the testing device 48 to test the low-side voltage 50 but also for the further testing device 56 to test the high-side voltage 58. If after the switched current source 36 has been switched on the testing device 48 detects that the low-side voltage 50 is below the comparison voltage $V_{TH'}$ and the further testing device 56 also detects that the high-side voltage 58 is still at the level of the predetermined further comparison voltage $V_{TH'}$, it is not possible for an open load 14, and therefore error OL, to be present. If the high-side voltage 58 is below the predetermined further comparison voltage $V_{TH'}$, it is not possible for one of the errors SCG1 or SCG2 to be present.

Figure 6:
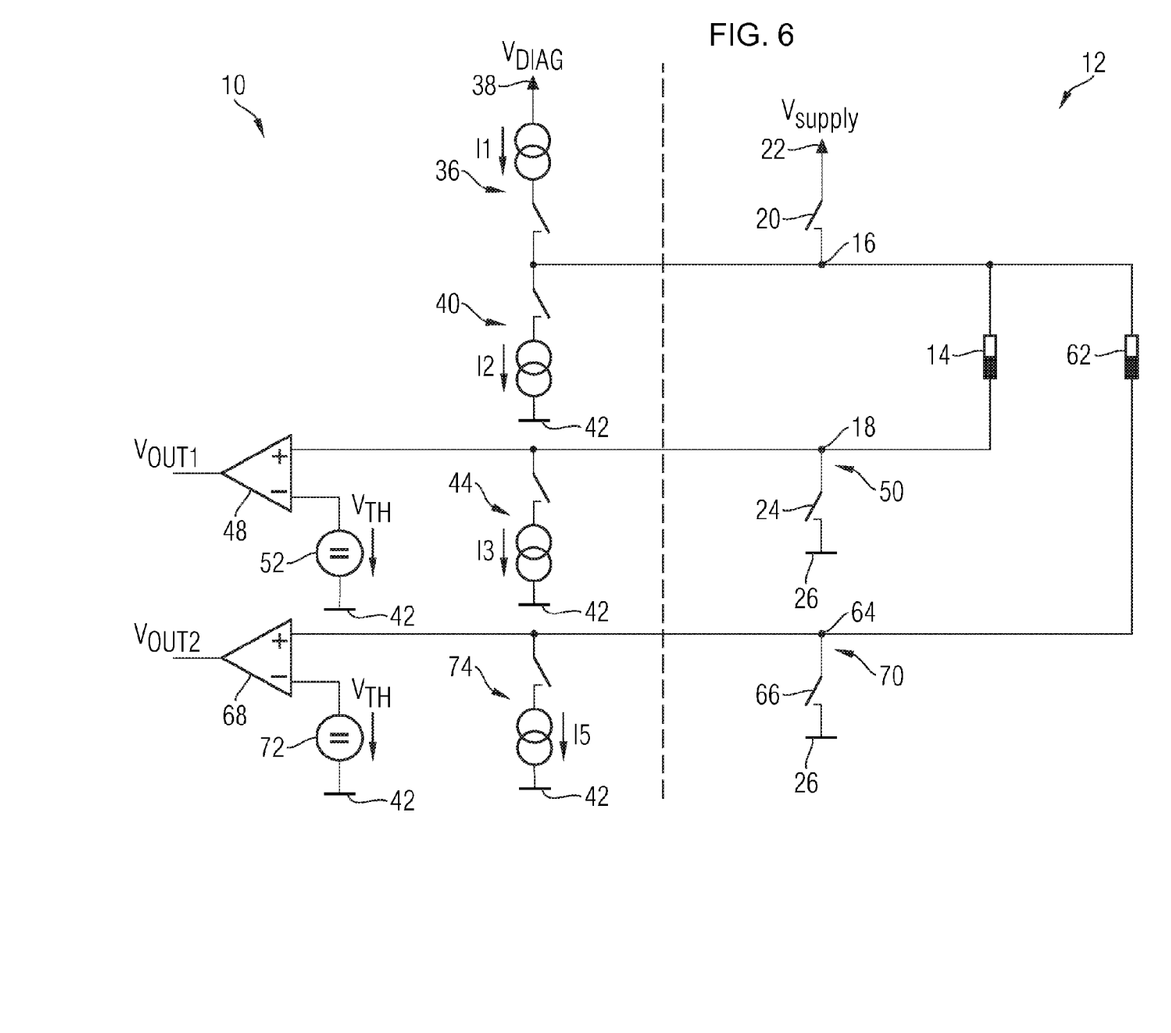
FIG. 6 shows a fourth exemplary embodiment of the inventive apparatus having a number of loads, which are connected to a common high-side power switch.

FIG. 6 shows a fourth exemplary embodiment of the inventive apparatus 10 for recognizing an error in the power bridge circuit 12. The power bridge circuit 12 here contains a number of loads, which are connected in a common manner to the high-side power switch 20. In addition to the load 14 there is a load 62 in the present exemplary embodiment. The load 62 here is likewise an ohmic-inductive load. At its low-side connection 64 the load 62 is connected by way of a specific low-side power switch 66 to the low potential 26 of the supply voltage $V_{supply}$. The apparatus 10 contains an additional testing device 68 for testing a voltage at the load 62. The testing device 68 is connected on the input side to the low-side connection 64 so that a low-side voltage 70 can be tested by means of the testing device 68. The additional testing device 68 likewise features a comparison device in the shape of a comparator, which compares voltages present at its inputs with one another and outputs a corresponding output signal $V_{out2}$. The comparator of the testing device 68 here compares the low-side voltage 70 with the predetermined comparison voltage $V_{TH}$, which is supplied by a voltage source 72 present at the comparator. An additional switched current source 74 is connected to the low-side connection 64 of the load 62, being also connected to the low potential 42 of the diagnosis voltage $V_{DIAG}$. The switched current source 74 supplies a current I5. The switched current sources 36, 40 and 44 and the monitoring device 48 are disposed as described above in relation to the second and third exemplary embodiments and as illustrated in FIGS. 4 and 5. There is no illustration and further description of freewheeling diodes and capacitors here for reasons of clarity.

The basic principle of error recognition remains the same as that of the second and third exemplary embodiments. However advantageously neither the switched current source 54 (FIG. 4) nor the testing device 56 (FIG. 5) is necessary here to differentiate between errors SCG1, SCG2 on the one hand and error OL on the other hand. To recognize errors SCG1, SCG2 and OL the switched current sources 36, 44 and 74 are dimensioned so that the currents I3 and I5 are smaller than the current I1. If the values of the low-side voltages 50 and 70 rise to those of the predetermined comparison voltage $V_{TH}$, then neither short circuits nor open loads are present. If the values of the low-side voltages 50 and 70 do not rise to those of the predetermined comparison voltage $V_{TH}$, then either a short circuit or an open load is present. If only one of the low-side voltages 50, 70 rises to above the predetermined comparison voltage $V_{TH}$ and the other does not, error OL, in other words an open load, is present at the load 14, 62, the low-side voltage 50, 70 of which is below the predetermined comparison voltage.

If an open load, i.e. error OL, is present at both loads 14, 62, this can be detected by deploying a further testing device with a comparator at the high-side connection 16 of the two loads 14, 62. If, after the switched current source 36 has been switched on, this further testing device detects a voltage value at the level of or above a predetermined further comparison voltage of the further testing device, error OL is recognized in all the load branches.

Figure 7:
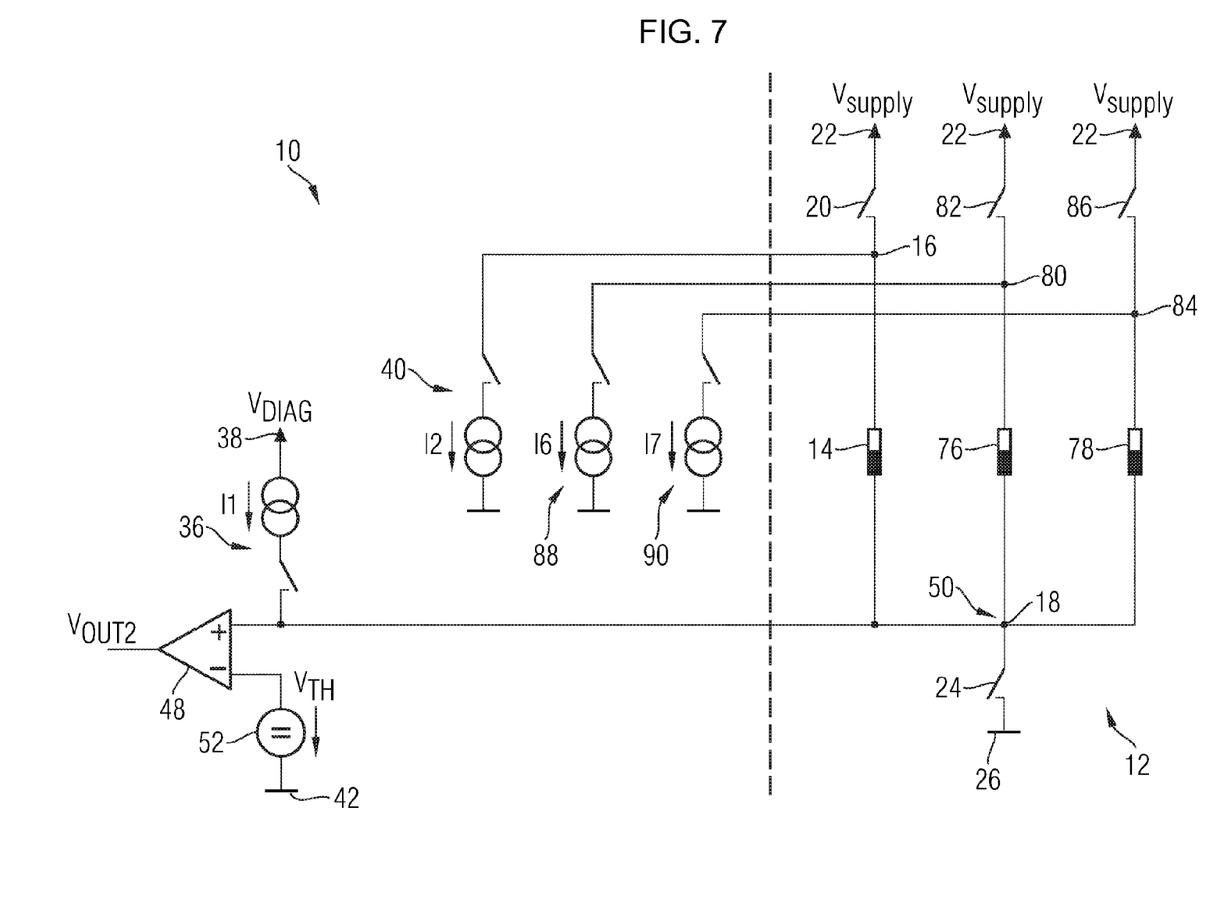
FIG. 7 shows a fifth exemplary embodiment of the inventive apparatus having a number of loads, which are connected to a common low-side power switch.

FIG. 7 shows a fifth exemplary embodiment of the inventive apparatus having a number of loads, which are connected in a common manner to the low-side power switch 24. In addition to the load 14 there is also a load 76 and a load 78 in the present exemplary embodiment. The loads 76, 78 here are likewise ohmic-inductive loads. At its high-side connection 80 the load 76 is connected by way of a specific high-side power switch 82 to the high potential 22 of the supply voltage $V_{supply}$. At its high-side connection 84 the load 78 is also connected by way of a specific high-side power switch 86 to the high potential 22 of the supply voltage $V_{supply}$. As in the first exemplary embodiment according to FIG. 3 the low-side connection 18 of the load 14 is connected to the switched current source 36, which is in turn connected to the high potential 38 of the diagnosis voltage $V_{DIAG}$. The apparatus 10 here further features the switched current source 40 connected to the high-side connection 16 of the load 14, which is also connected to the low potential 42 of the diagnosis voltage $V_{DIAG}$. Additionally to the first exemplary embodiment here the high-side connection 80 of the load 76 is connected to a switched current source 88, which is also connected to the low potential 42 of the diagnosis voltage $V_{DIAG}$. The high-side connection 84 of the load 78 is also connected to a switched current source 90 here, which is likewise connected to the low potential 42 of the diagnosis voltage $V_{DIAG}$. The switched current source 88 supplies a current I6 and the switched current source 90 supplies a current I7. The switched current sources 88, 90 are connected to the control device 46 (not shown), which controls them to switch them on and off. The currents I2, I6 and I7 supplied by the switched current sources 40, 88 and 90 respectively are greater than the current I1 supplied by the switched current source 36. The apparatus 10 here also features the testing device 48 connected to the low-side connections 18 of the loads 14, 76, 78 for testing the low-side voltage 50.

The strengths of the current sources should preferably be selected in a suitable manner, e.g.:

I2>I1;
I6>I1;
I7>I1.

The basic error diagnosis sequence in the present fifth exemplary embodiment corresponds largely to that of the first exemplary embodiment according to FIG. 3. This means that to recognize errors SCB1, SCB2 at the high-side power switches 20, 82, 86 and the loads 14, 76, 78 one after the other, the switched current sources 40, 88, 90 are switched on, while the current source 36 is switched off in each instance. To recognize errors SCG1, SCG2 at the low-side power switch 24 and the loads 14, 76, 78, the switched current sources 40, 88, 90 are then switched off and the current source 36 is switched on. To recognize error OL at the respective load 14, 76, 78, the switched current source 40, 88, 90 assigned to the respective load 14, 76, 78 is switched on, while the switched current source 36 is likewise switched on. In other words to recognize error OL at the load 14 the switched current sources 36 and 40 are switched on. To recognize error OL at the load 76 the switched current sources 36 and 88 are switched on and to recognize error OL at the load 78 the switched current sources 36 and 90 are switched on. With such a circuit of the apparatus 10 only a single testing device is advantageously required to recognize errors. This procedure and circuit for recognizing errors can be applied in a similar manner to a power bridge circuit 12, in which a number of loads are connected by way of a common high-side power switch to the high potential of the supply voltage and by way of specific low-side power switches respectively to the low potential of the supply voltage.

Figure 8:
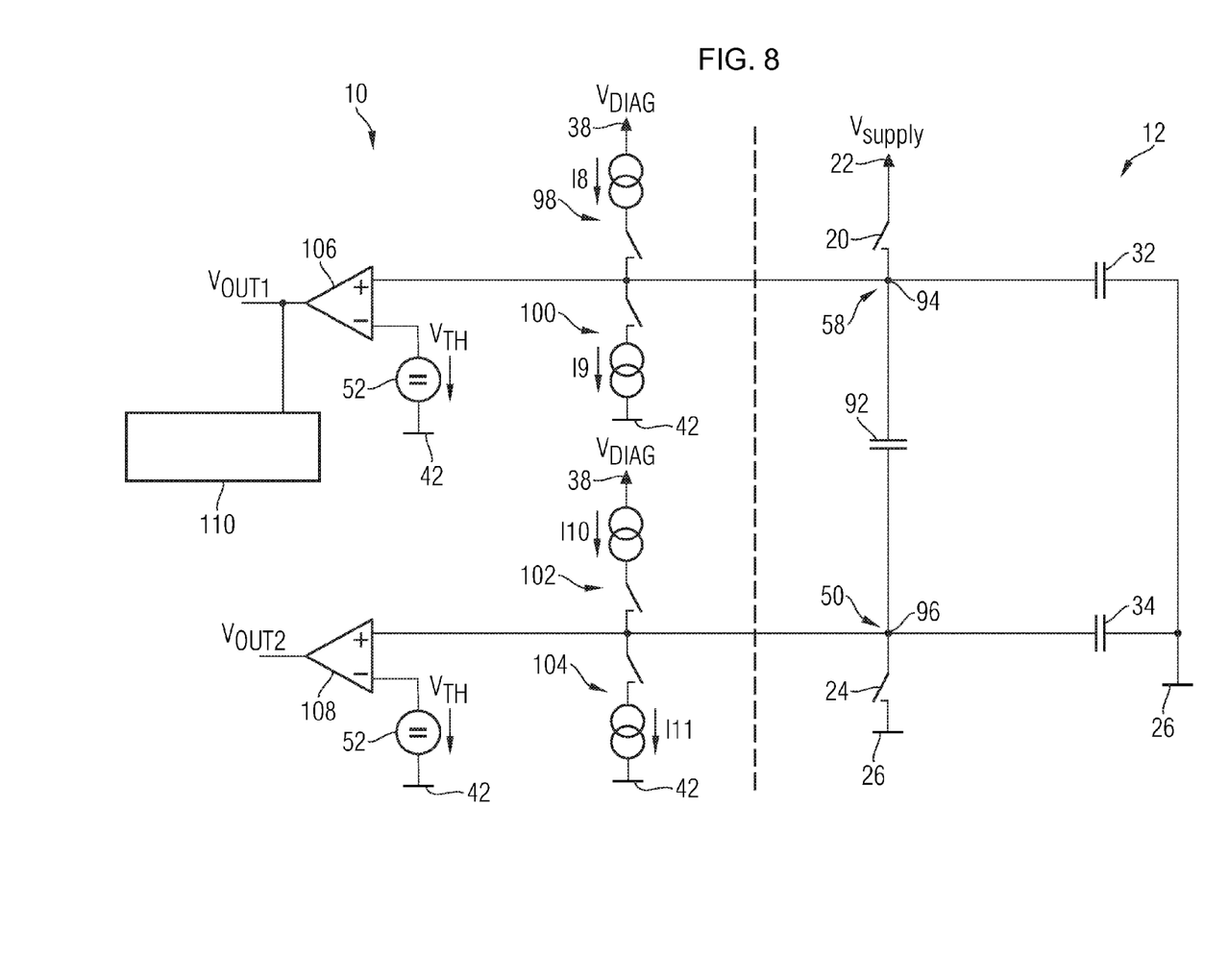
FIG. 8 shows a sixth exemplary embodiment of the inventive apparatus having a capacitive load and a detection device for detecting a charge and discharge time during the charging and discharging of the capacitive load and FIG. 9 shows a seventh exemplary embodiment of the inventive apparatus having the capacitive load.

FIG. 8 shows a sixth exemplary embodiment of the inventive apparatus 10 having a capacitive load 92. The load 92 is connected at a high-side connection 94 by way of the high-side power switch 20 to the high potential 22 of the supply voltage $V_{supply}$ and at a low-side connection 96 by way of the low-side power switch 24 to the low potential 26 of the supply voltage $V_{supply}$. The high-side connection 94 is connected by way of the capacitor 32 and the low-side connection 96 is connected by way of the capacitor 34 to the low potential 26 of the supply voltage $V_{supply}$. A switched current source to the high potential 38 and also to the low potential 42 of the diagnosis voltage $V_{DIAG}$ are respectively present at both the high-side connection 94 and the low-side connection 96. Connected to the high-side connection 94 here are a switched current source 98 to the high potential 38 and a switched current source 100 to the low potential 42. Connected to the low-side connection 96 here are a switched current source 102 to the high potential 38 and a switched current source 104 to the low potential 42. The switched current source 98 supplies a current I8, the switched current source 100 supplies a current I9, the switched current source 102 supplies a current I10 and the switched current source 104 supplies a current I11. Connected to the high-side connection 94 is a testing device 106 for testing the high-side voltage 58 and connected to the low-side connection 96 is a testing device 108 for testing the low-side voltage 50. The testing devices 106, 108 respectively contain a comparator as a comparison device, which is used to compare two voltages at inputs of the comparator. The testing device 106 compares the high-side voltage 58 with the predetermined comparison voltage $V_{TH}$ and the testing device 108 compares the low-side voltage 50 with the predetermined comparison voltage $V_{TH}$. The switched current sources 98, 100, 102 and 104 are controlled by means of the control device 46 (not shown in FIG. 8) to switch them on and off.

To recognize errors SCB1, SCB2, SCG1 and SCG2 all the switched current sources are first switched off with the load 92 switched off. The switched current sources 98 and 102 are then switched on. The testing devices 106, 108 test whether the high-side voltage 58 and the low-side voltage 50 respectively exceed the predetermined comparison voltage $V_{TH}$. The switched current sources 98, 102 are then switched off and the switched current sources 100, 104 are switched on. If the high-side voltage 58 and the low-side voltage 50 respectively then drop back to below the predetermined comparison voltage $V_{TH}$, it can be detected that none of the errors is present. However it is not possible with this procedure to detect the presence of error OL, since there is no direct current flowing through the capacitive load 92.

In order to be able to recognize error OL as well, the apparatus 10 according to the sixth exemplary embodiment contains a detection device 110 for detecting a charge and discharge time during the charging and discharging of the capacitive load 92. The detection device 110 is connected to the output of the testing device 106. To detect the charge and discharge time the low-side power switch 24 is first closed and the switched current source 98 is switched on. This causes the capacitive load 92 to be charged. The time measurement by means of the detection device 110 is started at the same time. The profile of the high-side voltage 58 is now tested, for which purpose a separate voltage detection device may be present. It is however also possible to embody the monitoring device 106 appropriately. When it is detected that the high-side voltage 58 is no longer increasing significantly, the switched current source 98 is switched off and the switched current source 100 is switched on. This causes the load 92 to be discharged again. Time measurement by means of the detection device 110 is terminated as soon as the high-side voltage 58 reaches the predetermined comparison voltage $V_{TH}$. The time period thus measured is proportional to the capacitance of the capacitive load 92. If it is has been possible beforehand to exclude the presence of errors SCG1, SCG2, then error OL is present, if the measured charge and discharge time is very short.

Figure 9:
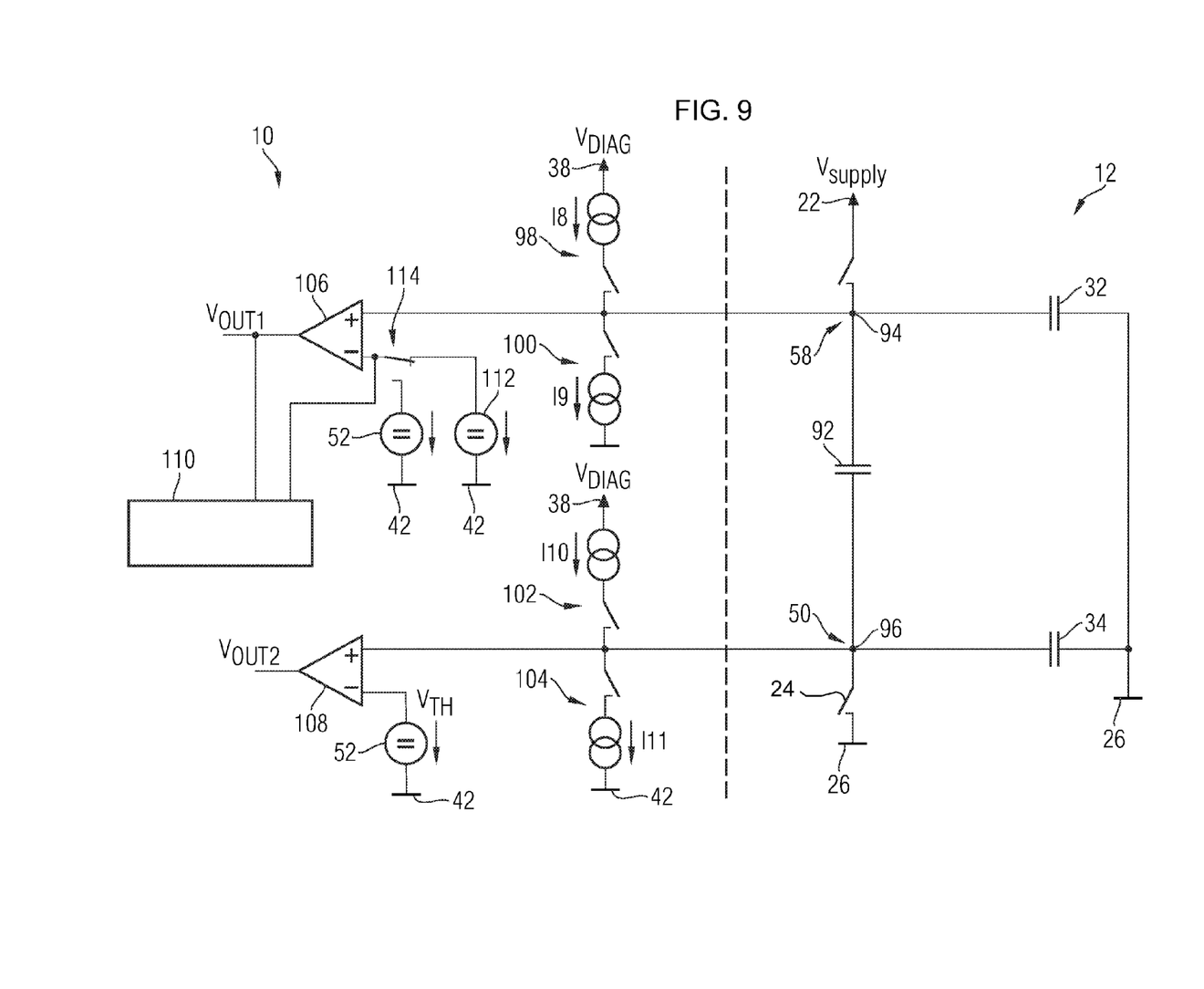

FIG. 9 shows a seventh exemplary embodiment of the inventive apparatus 10. The apparatus 10 according to the seventh exemplary embodiment corresponds largely to that of the sixth exemplary embodiment. However the testing device 106 here contains a further voltage source 112 in addition to the voltage source 52, said further voltage source 112 supplying an additional comparison voltage $V_{TH2}$ and being connected by way of a changeover switch 114 to one of the inputs of the comparator of the testing device 106. The voltage source 52 here is likewise connected by way of the changeover switch 114 to said input of the comparator. The detection device 110 is connected to the changeover switch 114 to control it. By actuating the changeover switch 114 it is possible to apply either the comparison voltage $V_{TH}$ of the voltage source 52 or the comparison voltage $V_{TH2}$ of the voltage source 112 to the one input of the comparator of the testing device. The comparison voltage $V_{TH2}$ here is lower than the comparison voltage $V_{TH}$.

With this embodiment of the testing device 106 the low-side power switch 24 is closed again and the switched current source 98 is switched on to measure the charge and discharge time during charging and discharging of the capacitive load 92. This causes the capacitive load 92 to be charged. Measurement of the charge and discharge time is started when the high-side voltage 58 reaches the lower comparison voltage $V_{TH2}$. The load 92 is recharged until the high-side voltage 58 reaches the comparison voltage $V_{TH}$. The switched current source 98 is then switched off and the switched current source 100 is switched on. The load 92 is discharged again as a result. As soon as the high-side voltage 58 reaches the comparison voltage $V_{TH2}$ again, time measurement is stopped.

This procedure and circuit increases the accuracy of the determination of the capacitance of the capacitive load 92 considerably. The criteria for starting and stopping time measurement are defined exactly with this embodiment of the apparatus 10 and the point at which they come into being can be detected precisely. It is also possible to provide an additional comparator in the testing device 106 instead of the changeover switch 114, said additional comparator receiving the high-side voltage 58 and the additional comparison voltage $V_{TH2}$ at its inputs.

The invention claimed is:

1. An apparatus for recognizing an error in a power bridge circuit having a load with a high-side connection and a low-side connection, a high-side branch having a high-side power switch connected between the high-side connection of the load and a supply connection for a high-potential of a supply voltage, and a low-side branch having a low-side power switch connected between the low-side connection of the load and a supply connection for a low-potential of the supply voltage, the apparatus comprising:

a first switched current source connected to the load and having a diagnosis connection for a high-potential of a diagnosis voltage;

a second switched current source connected to the high-side connection of the load and having a diagnosis connection for a low-potential of the diagnosis voltage;

a control device for controlling said first switched current source and said second switched current source, said control device configured such that when the high-side power switch is open and the low-side power switch is open, said control device switches on one of said first and second switched current sources, while the other of said first and second switched current sources is switched off, and then said control device switches off one of said first and second switched current sources and switches on the other of said first and second switched current sources;

a third switched current source connected to the low-side connection of the load and to said diagnosis connection for the high-potential of the diagnosis voltage, said control device connected to said third switched current source to control said third switched current source; and a testing device for testing a voltage at the load when one of said first and second switched current sources is switched on and the other of said first and second switched current sources is switched off, and when said one of said first and second switched current sources is switched off and said other of said first and second switched current sources is switched on;

said testing device connected to the low-side connection of the load, and the voltage at the load to be tested by said testing device being a low-side voltage occurring at the low-side connection of the load.

2. The apparatus according to claim 1, wherein said testing device has a comparison device for comparing the voltage at the load with a predetermined comparison voltage.

3. The apparatus according to claim 1, further comprising a further testing device for testing a further voltage at the load.

4. The apparatus according to claim 3, wherein said further testing device has a comparison device for comparing the further voltage with a predetermined further comparison voltage.

5. The apparatus according to claim 3, wherein said further testing device is connected to the high-side connection of the load and the further voltage at the load to be tested by said further testing device is a high-side voltage occurring at the high-side connection of the load.

6. The apparatus according to claim 1, wherein said first switched current source is connected to the low-side connection of the load.

7. The apparatus according to claim 1, wherein said first switched current source is connected to the high-side connection of the load.

8. The apparatus according to claim 1, wherein said control device switches on said third switched current source when said first switched current source is switched on and the low-side voltage is lower than the predetermined comparison voltage when said first current source is switched on.

9. The apparatus according to claim 1, further comprising a relief branch for a discharge of leakage currents, the low-side connection of the load is connected to said relief branch.

10. The apparatus according to claim 9, wherein said relief branch has a fourth switched current source, said fourth switched current source is connected to the low-side connection of the load and to said diagnosis connection for the low-potential of the diagnosis voltage.

11. The apparatus according to claim 1, further comprising capacitors, the high-side connection and the low-side connection of the load are connected by way of said capacitors to the supply connection for the low-potential of the supply voltage.

12. The apparatus according to claim 1, further comprising:

a first freewheeling diode having an anode and a cathode connected to the high-side connection of the load, the supply connection for the low-potential of the supply voltage is connected to said anode of said first freewheeling diode; and a second freewheeling diode having a cathode and an anode connected to the low-side connection of the load, the supply connection for the high-potential of the supply voltage is connected to said cathode of said second freewheeling diode.

13. The apparatus according to claim 1, further comprising a further low-side power switch;

wherein the power bridge circuit has at least one further load with a high-side connection connected to the high-side power switch and a low-side connection connected by way of said further low-side power switch to the supply connection for the low-potential of the supply voltage; and further comprising an additional testing device for testing a low-side voltage of the at least one further load, said additional testing device connected to the low-side connection of the at least one further load.

14. The apparatus according to claim 1, further comprising a further high-side power switch;

wherein the power bridge circuit has at least one further load with a low-side connection connected to said low-side power switch and a high-side connection connected by way of said further high-side power switch to the supply connection for the high-potential of the supply voltage; and further comprising a further switched current source connected to the at least one further load and to said diagnosis connection for the low-potential of the diagnosis voltage.

15. The apparatus according to claim 14, wherein said control device is also embodied in such a manner that when the high-side power switch and said further high-side power switch are open and the low-side power switch is open, said control device switches on one of said second switched current source and said further switched current source.

16. The apparatus according to claim 1, wherein the load is a capacitive load;

wherein said first switched current source is connected to the high-side connection of the load;

further comprising a first additional switched current source connected to the low-side connection of the capacitive load and to said diagnosis connection for the high-potential of the diagnosis voltage;

further comprising a second additional switched current source connected to the low-side connection of the capacitive load and to said diagnosis connection for the low-potential of the diagnosis voltage; and wherein said control device connected to said first and second additional switched current sources to control them and being embodied in such a manner that when said high-side power switch is open and the low-side power switch is open, said control device switches on said first switched current source and said first additional switched current source, while said second switched current source and said second additional switched current source are switched off, and switches on said second switched current source and said second additional switched current source, while said first switched current source and said first additional switched current source are switched off.

17. The apparatus according to claim 16, wherein the high-side power switch and the low-side power switch can be controlled with said control device for controlling said first switched current source, said second switched current source, said first additional switched current source and said second additional switched current source in such a manner that charging of the capacitive load takes place first and then discharging; and further comprising a detection device for detecting a charge and discharge time during charging and discharging of the capacitive load.

18. The apparatus according to claim 17, wherein said control device is embodied in such a manner that when the high-side power switch is open and the low-side power switch is closed, to charge the capacitive load, said control device first switches on said first switched current source, while said second switched current source is switched off, and then, to discharge the capacitive load, said control device switches off said first switched current source and switches on said second switched current source.

19. A method for recognizing an error in a power bridge circuit containing a load, a high-side branch having a high-side power switch disposed between a high-side connection of the load and a supply connection for a high-potential of a supply voltage, and a low-side branch having a low-side power switch disposed between a low-side connection of the load and a supply connection for a low-potential of the supply voltage, which comprises the steps of:
 connecting a first switched current source to the load and to a diagnosis connection for a high-potential of a diagnosis voltage;
 connecting a second switched current source to the high-side connection of the load and to a diagnosis connection for a low-potential of the diagnosis voltage;
 controlling the first switched current source and the second switched current source by means of a control device in such a manner that when the high-side power switch is open and the low-side power switch is open, one of the first and second switched current sources is switched on, while another of the first and second switched current sources is switched off, and then one of the first and second switched current sources is switched off and the other of the switched current sources is switched on;
 connecting a third switched current source to the low-side connection of the load and to the diagnosis connection for the high-potential of the diagnosis voltage, and connecting the control device to the third switched current source to control the third switched current source;
 connecting a testing device to the low-side connection of the load, wherein the voltage at the load to be tested by the testing device is a low-side voltage occurring at the low-side connection of the load; and
 testing a voltage at the load by means of the testing device when one of the first and second switched current sources is switched on and the other of the first and second switched current sources is switched off, and when one of the first and second switched current sources is switched off and the other of the first and second switched current sources is switched on.

20. The method according to claim 19, which comprises, with the control device, switching on the third switched current source when the first switched current source is switched on and the low-side voltage is lower than the predetermined comparison voltage when the first current source is switched on.

* * * * *